United States Patent
Tran et al.

(10) Patent No.: US 9,043,124 B1
(45) Date of Patent: May 26, 2015

(54) REMOTELY CONTROLLED VEHICLE CONTROL SYSTEM

(75) Inventors: Nghia X. Tran, San Diego, CA (US);
Michael Bruch, San Diego, CA (US);
Richard Adams, Chula Vista, CA (US);
Hoa V. Phan, Escondido, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 40 days.

(21) Appl. No.: 13/223,346

(22) Filed: Sep. 1, 2011

Related U.S. Application Data

(63) Continuation-in-part of application No. 13/006,261, filed on Jan. 13, 2011, now Pat. No. 8,442,750.

(51) Int. Cl.
*G08G 1/00* (2006.01)
*E01F 9/012* (2006.01)
*B60R 1/00* (2006.01)
*H04W 4/00* (2009.01)

(52) U.S. Cl.
CPC ............... *E01F 9/0122* (2013.01); *B60R 1/00* (2013.01); *H04W 4/00* (2013.01); *G08G 1/00* (2013.01)

(58) Field of Classification Search
CPC .................. E01F 9/0122; B60R 1/00
USPC ........... 701/117, 118; 340/12.5, 12.51, 13.24, 340/13.25, 13.26, 572.1, 572.8, 905, 907, 340/917, 949, 934, 988, 908, 908.1
See application file for complete search history.

(56) References Cited

U.S. PATENT DOCUMENTS

| | | | |
|---|---|---|---|
| 2005/0280553 A1* | 12/2005 | DiPiazza | 340/905 |
| 2006/0267736 A1* | 11/2006 | Tiernay et al. | 340/10.51 |
| 2007/0008140 A1* | 1/2007 | Saarisalo et al. | 340/572.7 |
| 2008/0160907 A1* | 7/2008 | Estevez | 455/3.05 |
| 2009/0024309 A1* | 1/2009 | Crucs | 701/118 |

* cited by examiner

*Primary Examiner* — John Q Nguyen
*Assistant Examiner* — Rodney P King
(74) *Attorney, Agent, or Firm* — SSC Pacific Patent Office; Arthur K. Samora; Kyle Eppele

(57) ABSTRACT

A system for controlling a plurality of vehicles can include at least one communications bus and a plurality of RFID detection tags that can be fixed to the communications bus equidistant from each other to define a plurality of RFID regions. Each vehicle within an RFID region can further include an RFID reader for receiving information from, and transmitting information to, the RFID tags. As the vehicle enters the RFID region for a particular RFID tag, the position of the vehicle (within the RFID region) can be communicated to the communications bus. A traffic control unit can be connected to the communications bus, and monitor can be in communication with a plurality of remotely controlled traffic control assets, such as stop signs, yield signs, traffic cones. After receiving position information on the vehicle, the monitor can selectively activate the traffic devices remotely to control vehicle traffic flow.

7 Claims, 7 Drawing Sheets

REMOTELY CONTROLLED VEHICLE CONTROL SYSTEM

This application is a continuation-in-part of U.S. application Ser. No. 13/006,261, filed Jan. 13, 2011 now U.S. Pat. No. 8,442,750, and entitled "Remotely Controlled Traffic Management System". The '261 application is hereby incorporated by reference herein in its entirety.

FEDERALLY-SPONSORED RESEARCH AND DEVELOPMENT

This invention (Navy Case No. 100789) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; e-mail ssc_pac_T2@navy.mil.

FIELD OF THE INVENTION

This invention pertains to systems and methods for monitoring pedestrian and vehicular traffic. More particularly, the invention pertains to systems for quick and effective deployment of vehicles, which can be controlled from a remote station to manipulate traffic flow.

BACKGROUND OF THE INVENTION

At many security gates, and in areas where there is a high rate of pedestrian and/or vehicle traffic, traffic cones and other traffic control assets can be used to control the flow of traffic. For example, at many elementary schools during periods when students are arriving and leaving, volunteers (parents or assigned students) hold stop signs and walk back and forth across the streets to signal vehicles to stop and let children cross the street. Similarly, at construction sites, construction workers often use hand signs or stop/yield traffic signs to control traffic flow. Other examples where traffic must be controlled include vehicles that are exiting from stadium parking lots after sporting events and concerts. For all of these examples, traffic control assets such as traffic cones, stop signs, yield signs and the like often must be manually maneuvered by a user at the site to control the traffic. There are often times when this task cannot be accomplished safely, either because of the volume traffic to be controlled (whether vehicle or pedestrian), or because of the speed of the traffic (primarily in vehicular traffic management cases).

Additionally, many various tracking methods have been employed to remotely direct and control autonomous robots and vehicles. Physical rail road tracks are very reliable, as vehicles and carts run on the system tracks, but such systems are very difficult to build and require a large initial investment to construct. Such systems can also be expensive to maintain. Some robot tracking systems use optical sensors that are placed on the robots/autonomous vehicles, and the sensors track a chemical that is placed along the desired path of travel for the robot. For these systems, chemical tracks require an inordinate amount of maintenance to keep the track clean. Still other systems use video/image processing, but video/image processing is still not very reliable and these types of systems can be unnecessarily complicated.

In view of the above, one object of the present invention is to provide a remotely controlled traffic management system that can function as a robotic road guard system to provide traffic management and control tools for security forces. Another object of the present invention is to provide a remotely controlled traffic management system that does not require human intervention at the site where the traffic is being controlled. Still another object of the present invention is to provide remotely controlled traffic management systems that allow for deployment and maneuvering of traffics assets from a remote control station. Still another object of the present invention according to several embodiments is to provide a remotely controlled traffic management system that quickly deploys signal traffic assets on roads and sidewalks, in buildings at security stations and gates, conference events, schools, etc. and remotely maneuvers the assets as desired by the remote user in real-time, according to changing traffic conditions at the site. These and other advantages of the invention, as well as additional inventive features, will be apparent from the description of the invention provided herein.

SUMMARY OF THE INVENTION

A system for controlling a plurality of vehicles and methods for manufacture in accordance with several embodiments can include at least one communications bus. A plurality of RFID detection tags can further be fixed to the communications bus so that they are equidistant from each other on the communications bus. With this configuration, each RFID tag can define an RFID region. Each vehicle to be monitored and/or controlled can further include an RFID reader for receiving information from, and transmitting information to, the RFID tags. As the vehicle enters the RFID region for a particular RFID tag, the position of the vehicle (within the RFID region) can be communicated to the communications bus.

The system and methods according to several embodiments can further include a traffic control unit that is connected to the communications bus. With this configuration, the communications bus can transmit the position of each vehicle to the unit. In some embodiments, there may be multiple pathways that define an intersection, with each pathway having a respective communications bus that is connected to the traffic control unit. For these embodiments, the traffic control unit can be used to control the movement of the vehicles through the intersection. To do this, the monitor can be in communication with remotely controlled traffic control assets such as stop signs, yield signs, traffic cones, and the like. The traffic devices can be activated by a signal from the unit. In response to the signal, the devices can activate in order to facilitate movement of vehicles through the intersection in an efficient manner.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

Figure 1:
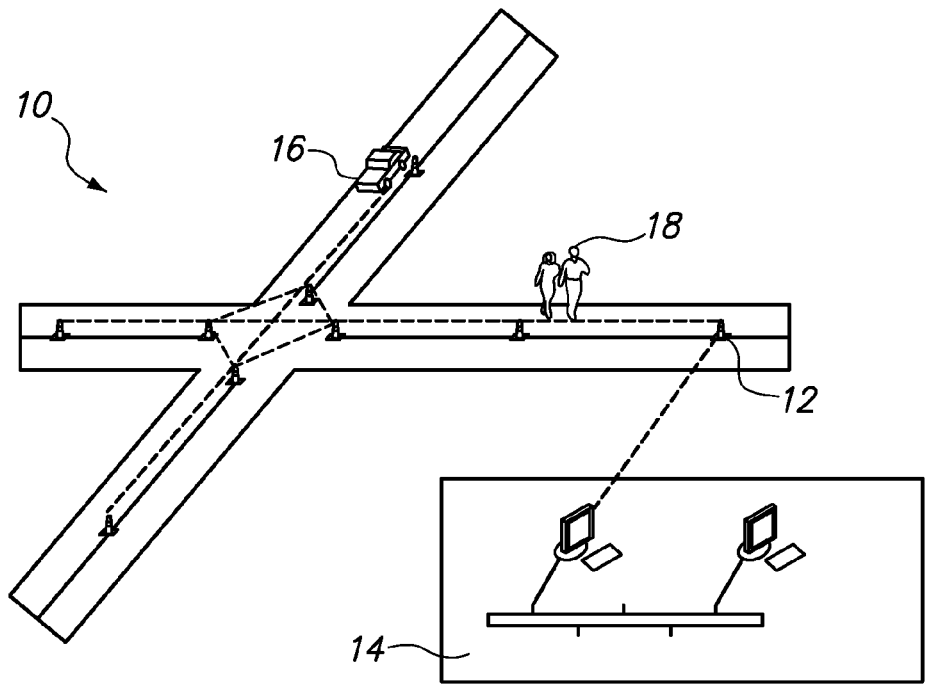
FIG. 1 is a general diagram of a traffic control system in accordance with several embodiments of the invention.

Referring initially to FIG. 1, a remotely controlled traffic management system in accordance with several embodiment of the present invention can be shown and can be generally designed by reference character 10. As shown in FIG. 1, the system 10 can include a plurality of traffic control assets 12, which can communicate both with each other and with a remote station 14 to establish the networked management system 10. The system 10 can be used to monitor and control vehicles 16, pedestrians 18, or a combination thereof, according to the user's needs. One example of such a situation is the need to control and manage both pedestrians 18 and vehicles 16 in the area immediately surrounding a stadium after an activity such as a concert or sporting event. In such situations, the system 12 can be quickly and safely deployed to an intersection area in response to changing concentrations of vehicles 16 and pedestrians 18.

As mentioned above, the structure of the traffic control assets 12 and cooperation of structure of assets 12 with remote station 14 allow for safe, real-time re-positioning of the assets 12 to accommodate changes in traffic patterns. Further, the user (not shown) at the remote control station can command pedestrians 18 and vehicles 16 to stop or wait via sound commands and/or visual command that can be transmitted through the closest asset 12 to the applicable vehicle 16/pedestrian 18. The manner in which this can be accomplished can be described more fully below.

Figure 2:
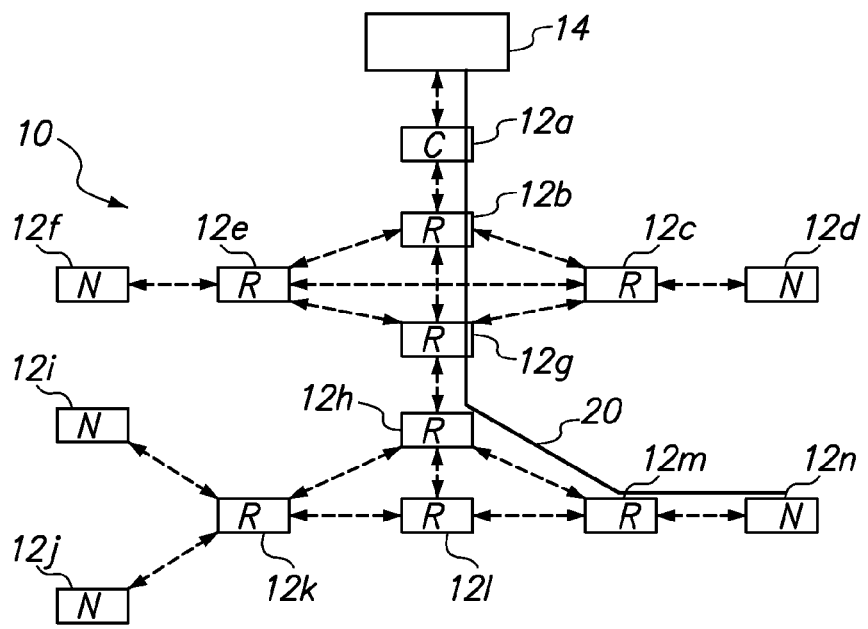
FIG. 2 is a diagram of the system of FIG. 1, which further illustrates the flow path of command signals from a remote control station to various traffic control assets in the system.

FIG. 2 illustrates the network nature of the traffic management system 10 according to several embodiments. In system 10, there can be a plurality of traffic control assets 12 that can function as command routers (R), which can route command from remote station 14 to remote asset 12, and relay data from remote assets 12 back to control station 14. A router is a traffic control asset that allows for passing through of commands to other assets that are more remote from control station 14. Traffic control assets 12a-12d in FIG. 2 can be example of traffic control assets that function as routers. The system 10 can further include several assets that function as nodes (N), i.e. as termination points for command from remote station 14. These assets can be thought of end points for commands coming from remote station 14. Traffic control asset 12d can be an example of a traffic control asset that functions as a node. Each asset 12 has the same electronic structure, as described below, but each asset can also be preconfigured before deployments via software to function as a router or a node, according to its position within the overall system 10.

Each asset 12 can be further configured in real time via a wireless path that can be represented by reference character 20. As shown in FIG. 2, path 20 represents a command that originated from the user at control station 14; the command is intended for traffic control asset (node) 12n. After being transmitted by control station 14, the command was received and passed on by traffic control assets 12a, 12b, 12g, 12h, 12m to 12n. From referring to FIG. 2, it can be seen that system 10 has network redundancies; there are alternative sequences of traffic control assets 12 that can be used to establish a path 20 to transmit a command from control station to traffic control asset 12n (or to/from any other of the traffic control assets 12, as desired by the user).

Figure 3:
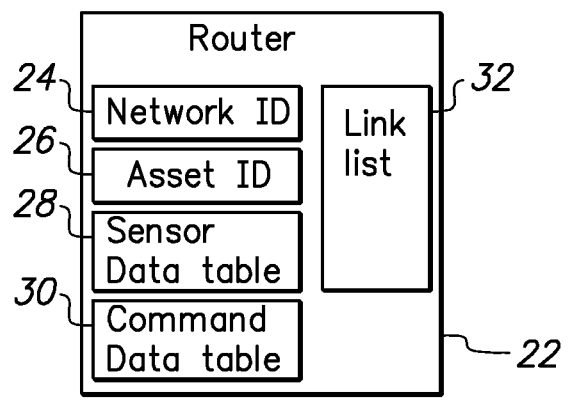
FIG. 3 is a depiction of the data that the traffic control assets might include for the system according to several embodiments.

FIG. 3 illustrates a block diagram of an asset data table 22 that can be included in each traffic control asset 12 to allow the asset 12 to be networked with other assets to establish the system 10. As shown in FIG. 3, asset data table 22 can include traffic Network ID data (represented by block 24) which can function to identify a network if more than one network has been established by system 10, in close proximity to each other. Each asset 12 in a given network must have the same network ID. Other networks in the area can have other network ID's, and the network ID for each network in each system 10 can be unique. Within the system 10, Asset ID (block 26 in FIG. 2) is the identification number of each traffic control asset in a same network. This Asset ID is different for every traffic control asset 12, and serves as an "address" in the traffic management network for system 10.

As shown by block 28, asset data table 22 can further include Sensor Data Table, which can temporarily store the newest and most up-to-date sensor data the traffic control sensors (described more fully below) have detected concerning traffic conditions. Each sensor on a traffic control asset 12 may be programmed to sample data continuously and to update Sensor Data Table 28 with the most current traffic data. When users request to retrieve the data, the data will be sent to the user. Command Data Table 30 can be used to store commands that have been transmitted from the users at control station 14 and transmitted through the assets that are functioning as routers. These commands may include voice and visual commands. The asset microcontroller (FIG. 8) can periodically check if any command has been received from control station. The traffic control asset 12 microcontroller can execute commands in the Command Data table in order received. Finally, asset data table 22 can include the data link list, depicted by block 32 in FIG. 3. The link list can be a list of Asset IDs (addresses) of Router(s) and/or Node(s) connect to it and the radiofrequency (RF) at which the asset 12 is linked with other assets 12.

The list of all Asset IDs of Router(s) and Node(s) in the link list 32 at each asset 12 may be sent back to the control station 14 periodically according to predetermined algorithm established in the ECU 38 as described below, or when the control station 14 requests the link lists. The link lists also provide number of assets 12 and groups of assets 12 or network branches so that the control station 14 can generate a map of all assets 12 in the network and calculate routing paths from/to control station 14 and assets 12. For example of data contained in sensor data table 28 of a vehicle approaching. The sensor table may contain: (1) Distance and speed information of the vehicle provided by radar; (2) Location and approaching direction information provided by positioning sensor and orientation sensors; (3) Environment conditions provided by weather sensor; or, (4) Timing provided by asset system clock.

In several embodiments, two antennas should be part of the sensor system. The antennas to fulfill both the transmit function and the receive function can be identical. Patch antennas can be a convenient way to provide the necessary communications link between the vehicle and various traffic control assets 16 on the path. The patch antennas can be circularly polarized. This can be achieved either by geometry or by a feed mechanism. A circularly polarized patch antenna has several advantages, namely: 1) Circular polarization minimizes polarization mismatch if the cone is knocked to the horizontal orientation (i.e. when the cone is knocked down, by accident or otherwise); 2) A patch antenna is a resonant structure which rejects virtually all signals except those in a narrow band; 3) The patch is typically very thin and be conformal to the cone; 4) The patch can be made very small by increasing the dielectric constant of the substrate of the patch; and, 5) The antenna is efficient as long as the dielectric constant of the substrate is not too large. The resonant nature of the patch can be convenient in an electrically noisy environment.

Figure 4:
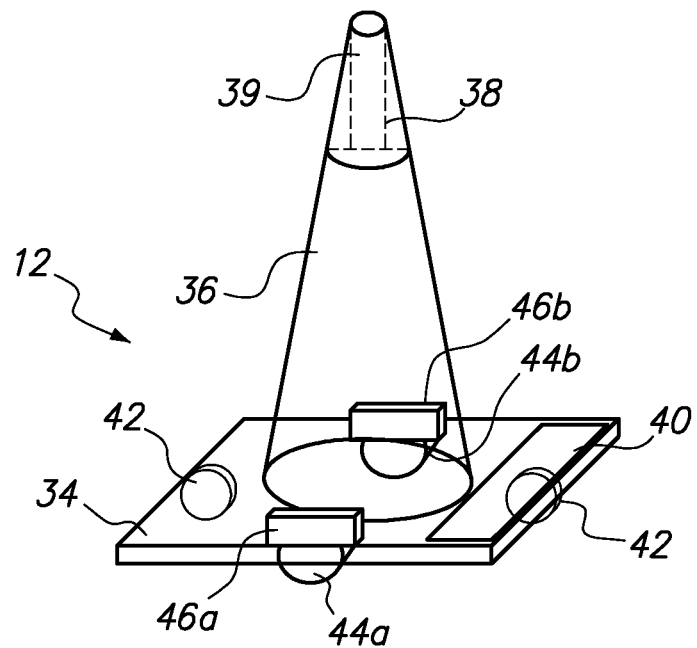
FIG. 4 is a traffic control asset that is configured as a traffic cone.

Referring now to FIG. 4, the structure of one embodiment of the traffic control asset 12 can be shown in greater detail. As shown, asset 12 can include a base 34 and a cone portion 36 that is attached to 34. Cone portion 36 can include an electronic control unit (ECU) 38, which can be incorporated into the cone portion 36. However, ECU 38 could also be incorporated onto the base 34 between base 34 and the interior defined by cone portion 36 in several embodiments. At least two casters 42 wheels 44a, 44b can be attached to base 34. Wheels 44a, 44b can be driven by corresponding motors 46a, 46b. The caster wheels 42 can prevent the cone from wobbling, while the wheels 44 allow for maneuverability of the asset 12. The motors 46 can be in communication with ECU 38 to maneuver the traffic control asset 12 in response to a user's command from control station 14. Alternatively, control stations 14 can have a series of non-transitory instructions that are embedded in a processor (now show) in station 14 for transmitting the commands to ECU according to a user's predetermined algorithm. Some embodiments of asset 12 can further include a solar portion 40 that is fastened to the upward-facing surface of base 34. The solar portion can convert sun energy into electricity to provide alternative power source for ECU and motors 46.

Figure 5A:
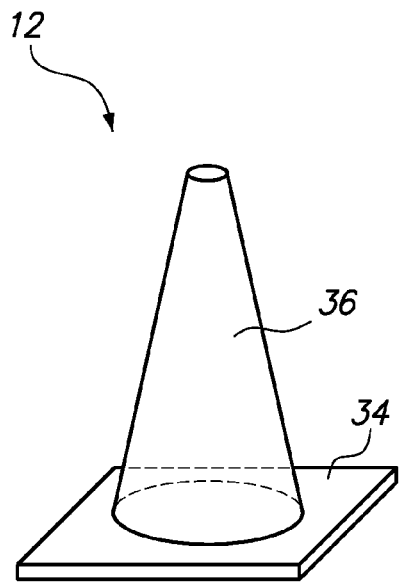
FIGS. 5A and 5B are illustrations of the traffic cone of FIG. 4, which further illustrate the traffic cone in a storage position and in a deployed configuration.
Figure 5B:
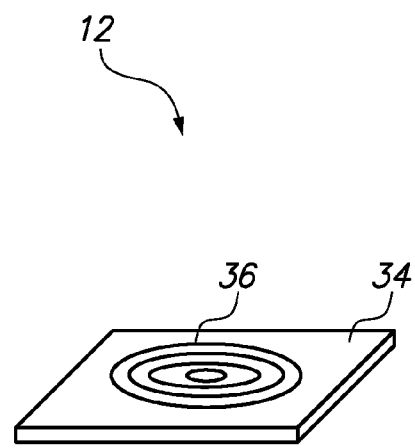
Figure 6A:
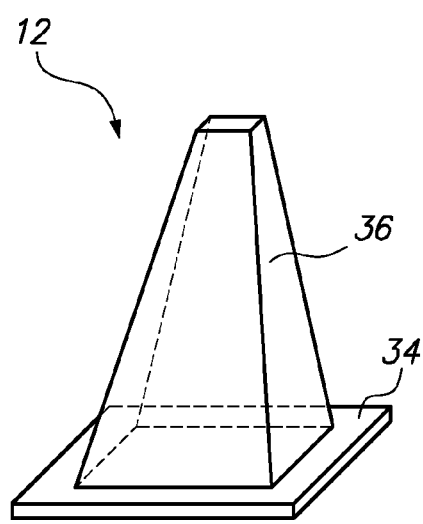
FIGS. 6A and 6B are illustrations of the traffic cone of FIG. 4, which further illustrate a pyramid configuration for the traffic cone in a storage position and in a deployed configuration.
Figure 6B:
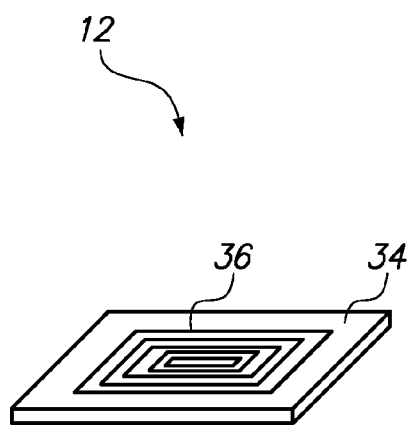

As shown by FIGS. 5B and 6B, the traffic control assets can have a storage configuration, wherein traffic control asset 12 is substantially flat. When in this configuration, cone portion 36 is collapsed against base 34. In this manner, the traffic control asset 12 can be constructed in such a way that many of assets 12 can stack be stacked on each other; for deployment, the assets 12 can be easily deployed, either manually or by an automated machine. The assets that are traffic cones can further have a deployed position, wherein the cone portion 36 is fully extended to form the traffic cone, as shown in FIGS. 5A and 6A. To do this, a telescoping actuator (not shown) can be placed inside of cone portion and between cone portion 36 and base 34, and the actuator can be extended to further extend the cone portion and thereby deploy the traffic cone. Or, the cone portion can be made of an inflatable bladder, which can be inflated to extend the cone portion upright to thereby deploy the traffic cone. Cone portion 36 can also be formed in a manner which gives the traffic cone a somewhat pyramidal appearance, as best seen in FIG. 6A.

Figure 7A:
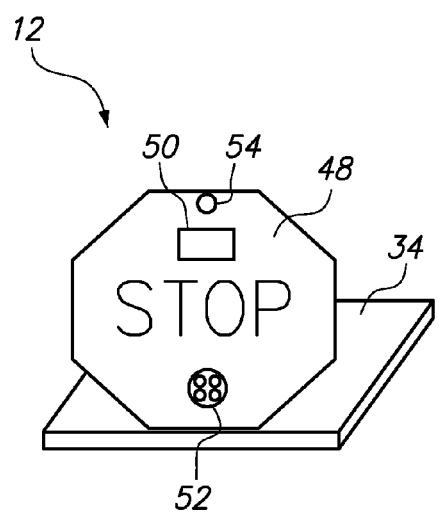
FIGS. 7A and 7B are drawings of a traffic control asset that is a stop sign in a deployed position and a storage position, respectively.
Figure 7B:
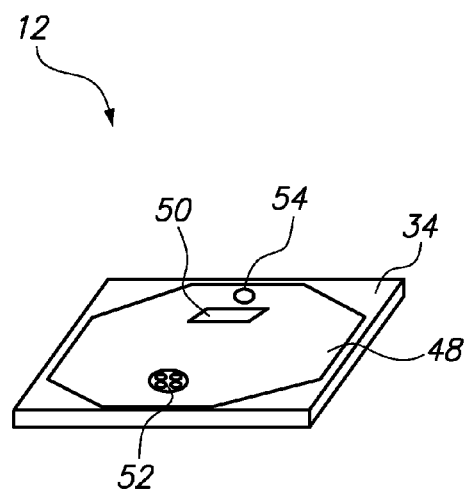

Referring now to FIGS. 7A and 7B, an alternative embodiment of the traffic control asset 12 can be shown. In several of these embodiments, a sign portion 48, such as an octagonal stop sign in several embodiments, can be hingedly attached to base 34 on one edge of sign portion, as shown in FIGS. 7A-7B. An actuator (not shown) can interconnect sign portion 48 and base 34. For deployment the actuator can pivot sign portion 48 from a storage position depicted in FIG. 7B, where the sign portion is proximate the base and substantially horizontal, to a deployed position shown in FIG. 7A, where the sign portion 48 is substantially vertical. The base 34 and the sign portion 48 are designed so that when the sign portion 48 is horizontal and the traffic control asset is in a storage configuration, they establish a flat low perspective and are sturdy enough so that they can be run over by vehicles 16 without being damaged.

The tasks of pushing up or pulling down the sign portion to deploy or store the traffic control asset 12 can be controlled via a wireless link from control station 14, as described above. Or, a simple wireless remote control device with a push button can be used to control the sign portion up or down. A more complicated wireless remote device may have several buttons to control several signs and display and speaker to monitor video and audio at the scenes. A wireless remote control device may be mounted on a portion at a control station 14 or the device may be a handheld device.

On sign portion 48, besides the main sign "STOP" sign, various components can be added to increase the capability of to the asset to direct traffic. Specifically, light 50 and audio transducer 52 can be added to provide visual and audio aids to drivers and walkers as when the sign portion 48 is vertical (deployed). The light 50 may be able to display differences in color, differences in brightness and to either blink or provide a steady illumination. Audio transducer 52 may be able to sound buzzer and/or provide voice messages to vehicles 16 and particularly pedestrians 18 in proximity to the asset 12. The messages on the sign portion 48 may be painted, engraved, manually changeable, or they can be electronic displays (LED, LCD, etc.).

In some embodiments, a camera 54 can be added to traffic control asset 12, as shown in FIGS. 7A and 7B. The camera 54 can provide view of the vehicle fronts when sign portion 48 is vertical (deployed). Alternatively, sign portion can be horizontal (in the storage position) and camera 54 can be used to photograph the undercarriage of a vehicle 16, to check for contraband, explosive devices and the like. Light 50 may be used as lighting for the camera 54. In still other embodiments, other sensors such as motion sensors, chemical sensor, and weather condition sensors may also be integrated onto the asset for specific applications.

The aforementioned sensors can include car detection sensor (magnetic, metal, motion, infrared, laser, sound, video means), human proximity sensor (motion, infrared, laser, sound and video sensors). The global positioning system (GPS), compass and orientation sensor can provide geometry and location wherever the traffic control asset 12 is placed. The Global Position System (GPS) sensor, compass and orientation sensor can also provide position feedback once the traffic control asset 12 is re-positioned. Weather condition sensors including wind (anemometer), temperature, humidity, barometer sensor provide ambient conditions. The camera can be used to capture events the can occur in the area (such as the license plate of a vehicle that has ignored the traffic control asset, for example). The camera can also provide live video to viewer at remote control station 14 via the wireless network.

Figure 8:
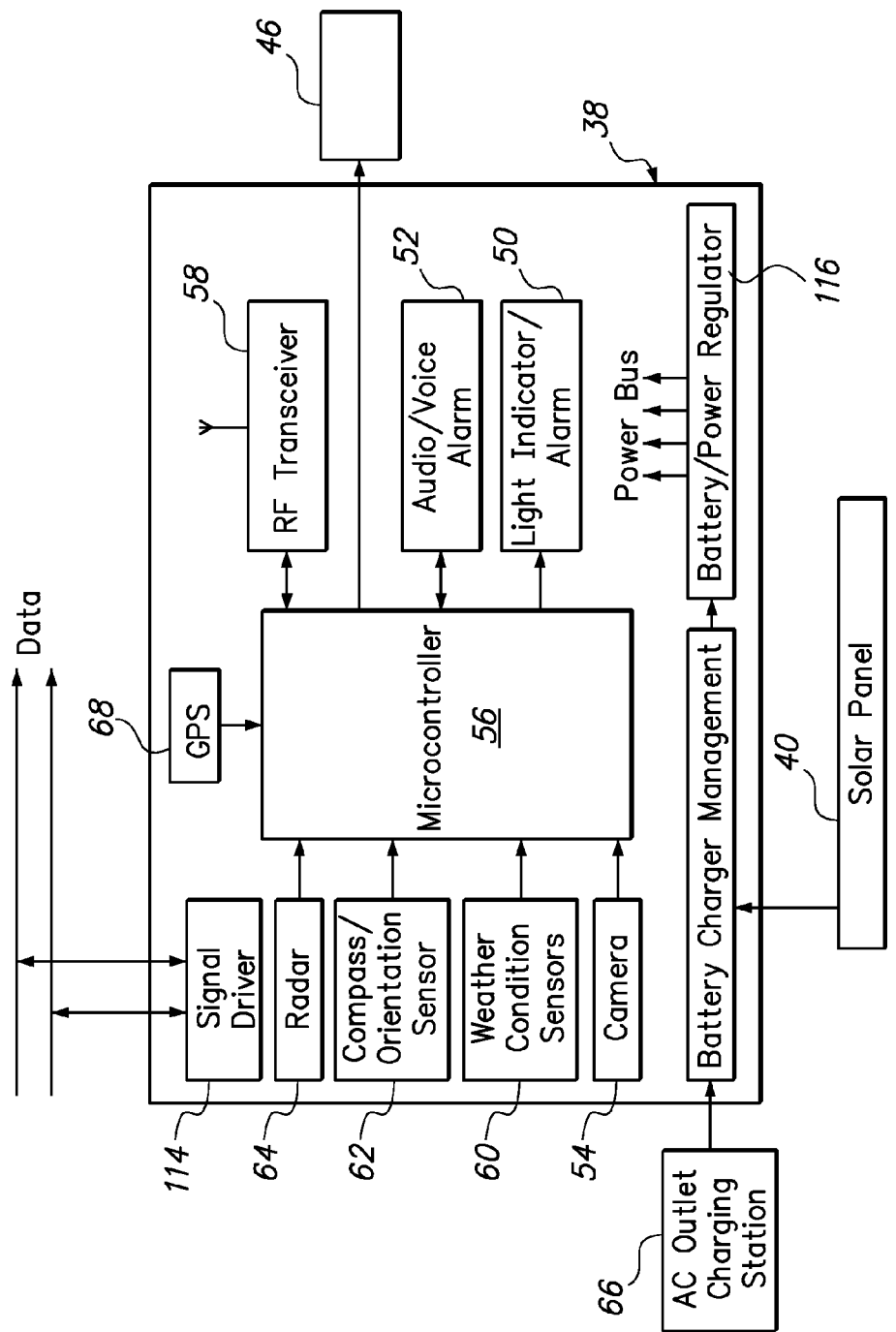
FIG. 8 is a block diagram of the electronic control unit (ECU) for the traffic control asset of FIG. 2.

Referring now to FIG. 8, the inputs and output of the ECU 38 can be more fully illustrated. As shown, ECU can include a microcontroller 56, which receives inputs from control station 14 via RF transceiver 58. As shown in FIG. 8, the microcontroller 56 for ECU 38 is also in signal communication with audio/voice component 52, light 50 and camera 54, as well as with various specialty sensors, such as weather condition sensors, 60, compass/orientation sensors 62, and radar 64. The aforementioned solar panel 40 can also be connected to ECU to provide power; an AC outlet charging station 66 can also be provided as an alternative source of power for the asset 12. Traffic asset 12 may use batteries or external power supply depends on applications and situation.

The microcontroller 56 receives commands from control station 14 via the RF transceiver 58. In response to the comment, the microcontroller can provides a control signal to activate audio transducer 52, light 50, and the actuators to deploy traffic control assets having a cone portions 36 (to deploy asset 12 as a traffic cone), or to flip up the sign portion 48 (to deploy asset 12 as a stop sign). To re-position traffic control asset 12 in response to a command from control station 14, microcontroller 56 can send a signal to motors 46 that corresponds to the received command, to operate motors 46, which further turns wheels to move asset 12 to a desired position in response to the received comment. Compass/Position sensor 62 can provide feedback to microcontroller 56 as to the actual position of traffic asset 12. Or, microcontroller 36 can receive an input from GPS source 68 to determine its location, as shown in FIG. 8. All of the above can be accomplished via non-transitory instructions that are incorporated into microcontroller 56.

Figure 9:
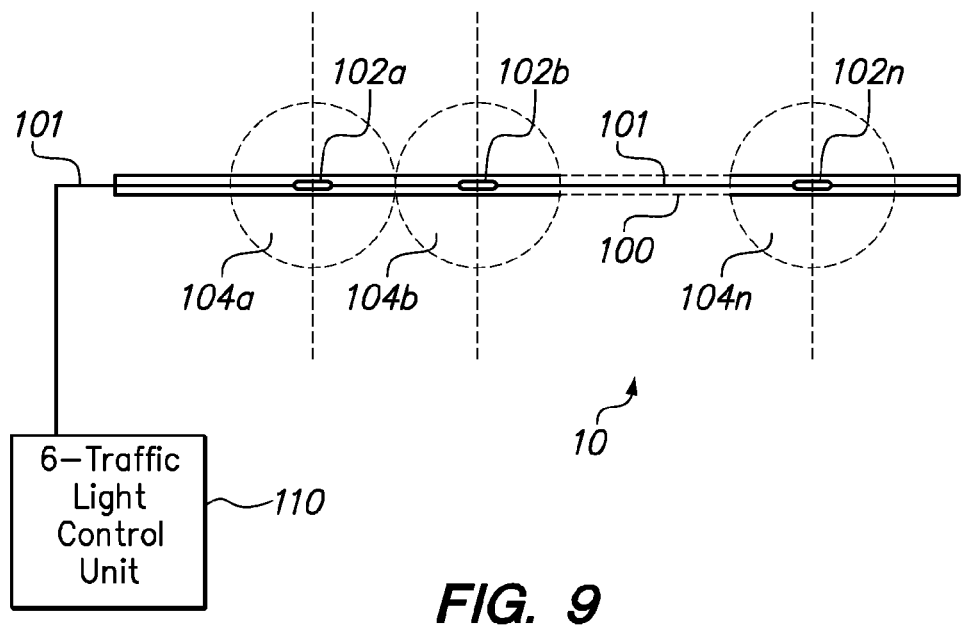
FIG. 9 is an illustration of an alternative embodiment of the traffic control system invention of FIG. 1.
Figure 10:
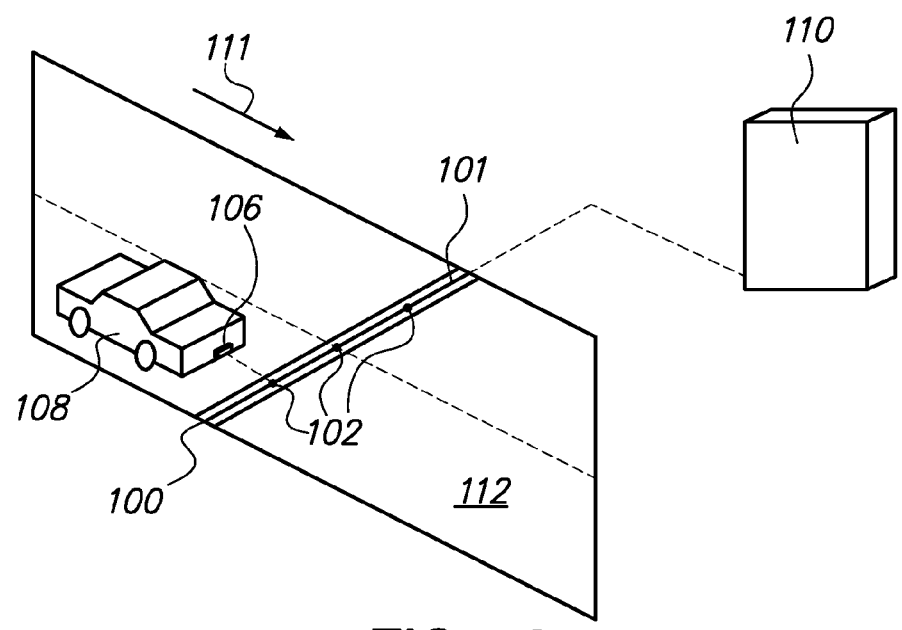
FIG. 10 illustrates how the traffic control system of FIG. 9 can be transmitted to a traffic control unit.

Referring now to FIGS. 9-10, several alternative embodiments of a remote traffic control system can be shown, wherein the system 10 can communicate with vehicles, as well as monitor the vehicles. As shown in FIG. 9, system 10 can include a Road Encoder Radio Frequency Identification (RER) bar 100, which can further include a communications bus 101. The communications bus 101 can be a metal wire or similar type of structure that can be placed along the desired path of travel of the vehicle in several embodiments. The system 10 can further include a plurality of radio frequency identification (RFID) tags 102a, 102b . . . 102n for transmission of both power and data. RFID tags 102 can be fixed on bus 101 so that they are equidistant from each other. With this configuration, a plurality of RFID detection regions 104a, 104b . . . 104n that correspond to a respective RFID tag 102 can be established along communications bus 101. The RFID tags 102 can also received power remotely from the communications bus 101, or local via a local power supply such as solar panels embedded in the RER bar 100 or batteries. Communications bus for RER bar 100 is further placed in communication with traffic control unit 110, as shown in FIG. 9. The RER bar 100 can also be provided with its own unique RER bar identification. If the RER bar 100 can be located on a corresponding road or pathway to be traveled, the RER bar identification can also function as identification of that road/pathway.

FIG. 10 illustrates a vehicle 108 and an RFID reader 106 that can be fixed to vehicle 108. As depicted in FIG. 10, the RFID reader 106 can be in communication with RFID tag 102, so that RFID tag 102 and RFID reader 106 transmit and receive information from each other. FIG. 10 further illustrates a configuration wherein RER bar 100 is installed perpendicularly to the intended direction of travel across road 112 that is indicated by arrow 111. As vehicle 108 travels in a lane on road 112, vehicle 108 goes across the communications bus 101. When this occurs, RFID reader 106 moves into range for RFID tag 102 and reader 106 and tag 102 establish communication. RFID tag 102 reads the RFID reader 106 and transmits position information of vehicle 108 through communications bus 100 to traffic control unit 110.

Figure 11:
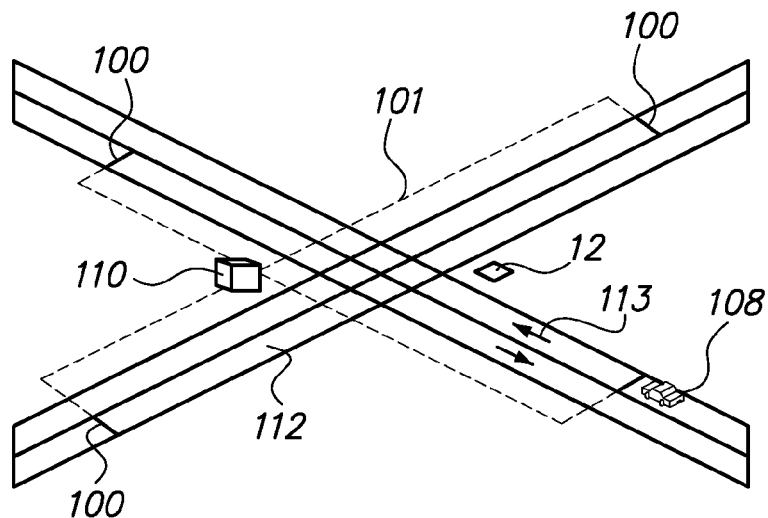
FIG. 11 illustrates how the system of FIG. 9 can be arranged to control vehicle movement in several embodiments; and, FIG. 12 is a drawing of the RFID tag and RFID reader, which shows how the RFID tag and RFID reader cooperate to keep the vehicle centered on the RER bar.

FIG. 11 illustrates an example wherein at least two RER bars 100 can be used in roads 112 that define an intersection. Based on RER bar identification number and a database of road information, when vehicle 108 enters region 104 and is within RF range of the corresponding RFID tag, information pertaining that particular road, such as prescribed driving direction (shown by arrow 113 in FIG. 11 for this example), speed limit, street name, cross street, upcoming traffic devices, and the like can be transmitted to the vehicle 108 from traffic control unit 110 via communications bus 101 and RFID tag 102. If the vehicle is manned, the information can further be displayed to the driver. Similarly, information that pertains to the vehicle 108 can be transmitted to the road, such as the vehicle size, weight, direction and speed of travel, etc. Such data can be transmitted via communications bus 101 to traffic control unit 110, which can selectively activate traffic asset 12 to manipulate the travel of vehicle 108, and thereby control traffic through the intersection.

Referring back to FIG. 8, the manner in which data is transmitted through the system 10 between traffic control unit 110 and RFID tags 102 can be shown. Traffic control unit 110 and RFID tag 102 can include an ECU with a signal driver for transmission of data from traffic control unit 110, or have very similar structure to the electronic control unit ECU 38 that is described above (for this embodiment, some elements of the ECU may not be necessary, such as the compass sensor 62, camera 54, and audio voice alarm 52, as the ECU would be on a RFID tag that is fixed in a bus on a fixed RER bar 100, for example). As shown in FIG. 8, RFID tag 102 and/or unit 110 can include an ECU with a signal driver 114 for accepting data (from vehicles 108 via RFID tags 102) from communications bus, for further transmission to microcontroller 56, and for transmitting activation signals from microcontroller 56 through communications bus to remote traffic assets 12 as described above. As shown in FIG. 8, a power regulator 116 can be included in ECU 38 to provide a smooth, even level of power to microcontroller 56, signal driver 114 and RF transceiver 58 for RFID tag 102.

Figure 12:
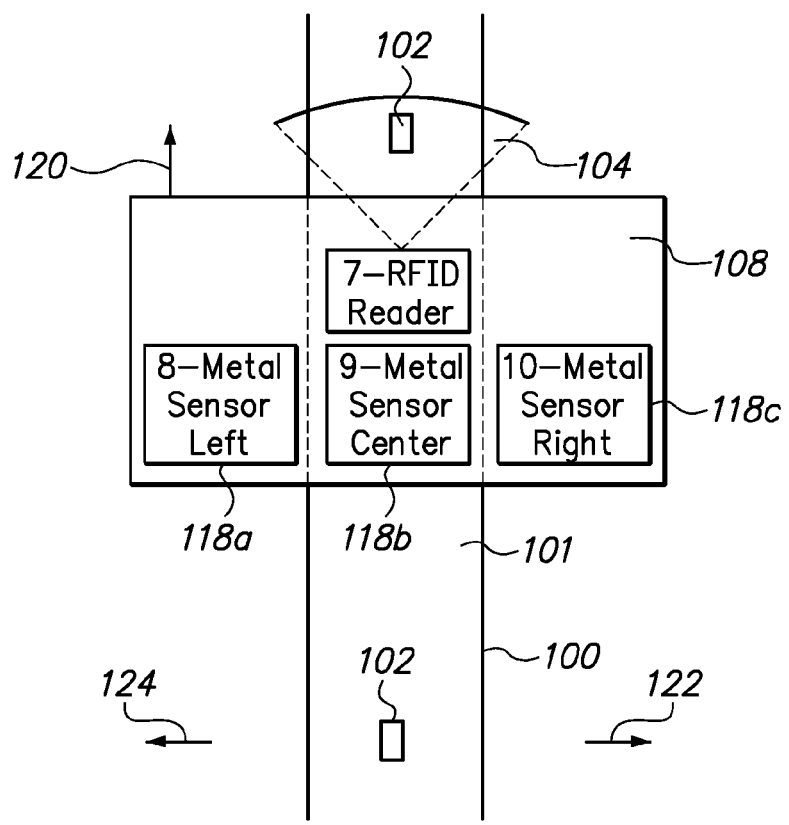

Referring now to FIG. 12, structure for maintaining alignment between the RFID tag 102 and RFID reader in vehicle 108 can be shown. As shown in FIG. 12, RFID tags 102 are fixed on communications bus 101 (which in several embodiments is a metal wire or similarly conducting material) equidistant from each other. A metal sensor 118b can be placed on vehicle 108 on its centerline and additional sensors 118a and 118c can be fixed on vehicle 108 perpendicularly to the direction of travel of vehicle 108 indicated by arrow 120, on opposite sides of sensor 118a and at an equal distance from sensor 118a.

As seen in FIG. 12, as vehicle 108 moves in direction indicated by arrow 120, RFID Tag 102 and RFID Reader are in data communication with each other via an RF link as described above. If vehicle 108 is correctly centered along communication bus for RER bar 100, only sensor 118b detects the metal communications bus 101. If vehicle 108 is off center in the direction indicated by arrow 122, however, then sensor 118a can detect the metal communications bus. The detection information is read and processed by the controller (not shown) on the vehicle 108 and the controller controls vehicle to steer in the direction by arrow 124 until only sensor 118b detects the communications bus (and sensor 118a does not). Similarly, if sensor 118c can detect the communications bus, the controller on the vehicle controls vehicle to steer directions in the same manner as described above (but in the direction indicated by arrow 122) to maneuver vehicle 108 until only sensor 118*b* (and not sensor 118*c*) detects the communication bus on RER bar 100. In another communication method, the detection information also can be transmitted to RFID tag 102 via RFID reader 106 to traffic control unit 110. In response, traffic control unit 110 can transmit maneuverability information to steer vehicle 108 in the direction indicated by arrow 124 until only sensor 118*b* detects the communications bus (and sensor 118*a* does not). Similarly, if sensor 118*c* can detect the communications bus, traffic control unit can transmit steering directions in the same manner as described above (but in the direction indicated by arrow 122) to maneuver vehicle 108 until only sensor 118*b* (and not sensor 118*c*) detects the communication bus on RER bar 100. If all the three metal sensors 118 do not detect the communications bus on RER bar 102, the vehicle 106 is completely off the track, and the system 10 may not to be stopped to manually place vehicle 106 on track.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling vehicle traffic for a plurality of vehicles, comprising;
    an Road Encoder Radio Frequency Identification (RER) bar including at least one communications bus;
    a plurality of Radio Frequency Identification (RFID) detection tags fixed to said communications bus equidistant from each other;
    an RFID reader on each said vehicle for receiving information from, and transmitting information to, at least one of said RFID tags;
    a traffic control unit in communication with said bus;
    at least one mobile traffic control asset remotely located from each of said plurality of vehicles and said traffic control unit, said at least one mobile traffic control asset in communication with said traffic control unit; and,
    said mobile traffic control asset repositioning itself relative to said plurality of vehicles in response to communication from said traffic control unit when one of said RFID readers from said vehicles indicates that said vehicle is within a predetermined said RFID detection region.

2. The system of claim 1 wherein said traffic control assets are selected from the group consisting of stop signs, yield signs and traffic cones.

3. The system of claim 1, wherein each of said at least one communications bus is embedded within a respective pathway, wherein at least two of said pathways are arranged to define an intersection, and wherein said traffic control asset is positioned to control movement of said vehicles through said intersection.

4. The system of claim 3, wherein:
    a plurality of pedestrians occupy at least one of said pathways;
    at least one of said traffic control assets has a means for detecting said pedestrians; and,
    wherein said traffic control unit repositions said traffic control assets according to the presence of pedestrians and vehicles on said pathways.

5. A transport system, comprising:
    at least one vehicle having a Radio Frequency Identification (RFID) reader fixed thereto;
    a RFID tag for receiving position information from said RFID reader; a communications bus, said RFID tags being fixed to said communications bus equidistant from each other for determining the position of said vehicle;
    a traffic control unit in communication with said communications bus for receiving position information on said vehicle; and,
    at least one mobile traffic control asset remotely located from said at least one vehicle and said traffic control unit, said at least one mobile traffic control asset in communication with said traffic control unit; said mobile traffic control asset repositioning itself relative to said plurality of vehicles in response to communication from said traffic control unit according to said position information from said RFID readers.

6. The system of claim 5, wherein said traffic control assets are selected from the group consisting of stop signs, yield signs and traffic cones.

7. The system of claim 5, wherein each of said at least one communications bus is embedded within a respective pathway, wherein two of said pathways are arranged to define an intersection, and wherein said traffic control unit is selectively positioned to control movement of said vehicles through said intersection.

* * * * *